Oct. 26, 1965 A. O. COBBS 3,213,556
VEHICLE REGISTRATION HOLDER
Filed Aug. 26, 1963
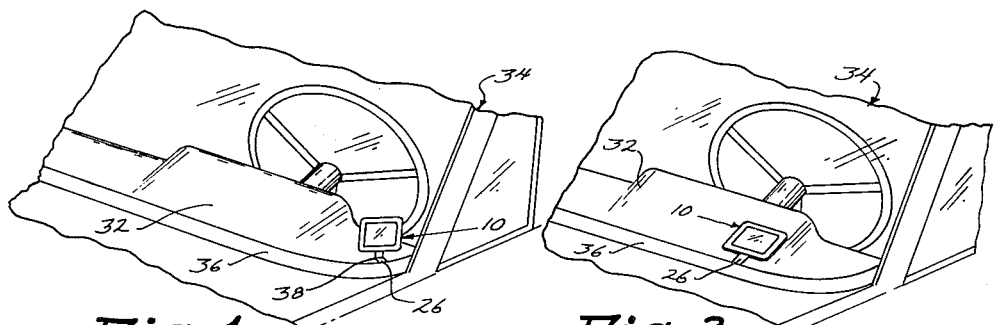
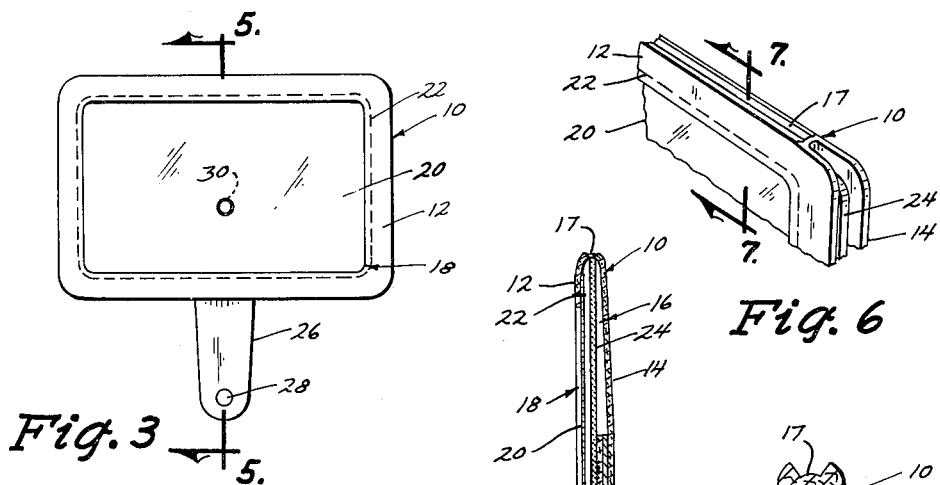
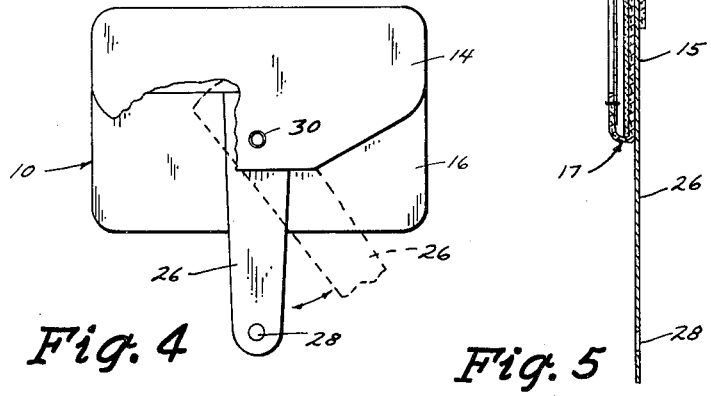
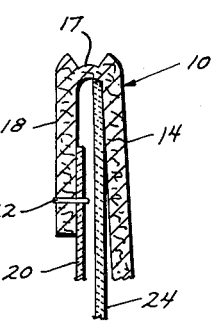
INVENTOR
ANSALEM O. COBBS
BY
Talbert Dick & Zarley
ATTORNEYS _United States Patent Office_

3,213,556
Patented Oct. 26, 1965

3,213,556
VEHICLE REGISTRATION HOLDER
Ansalem Orville Cobbs, 621 8th St., Des Moines, Iowa
Filed Aug. 26, 1963, Ser. No. 304,375
1 Claim. (Cl. 40—10)

Vehicle registration holders for many years were mounted on the steering posts of automobiles and the like. However, with the advent of the automobiles of recent years and the new designs therefor, it is difficult if not impossible to mount a registration holder on the vehicle steering post. Registration holders have been designed which can be located at positions other than on the steering post, but they are ordinarily limited to one specific location on the body of the vehicle, such as only on the sun visor or only the dashboard. In addition, these devices do not permit the certificate or registration to be easily mounted in and removed from the holder, and they are characteristically expensive to manufacture.

Therefore, a principal object of this invention is to provide a vehicle registration holder which can be positioned in a plurality of positions on the vehicle body.

A further object of this invention is to provide a vehicle registration holder which is comprised of a plurality of parts but which is held together primarily by a single fastening element.

A still further object of this invention is to provide a vehicle registration holder which will easily receive a certificate and from which a certificate can be easily removed.

A still further object of this invention is to provide a vehicle registration holder that is economical of manufacture, durable of use, and refined in appearance.

These and other objects will be apparent to those skilled in the art.

This invention consists in the construction, arrangements, and combination, of the various parts of the device, whereby the objects contemplated are attained as hereinafter more fully set forth, specifically pointed out in the claims, and illustrated in the accompanying drawing, in which:

FIGURE 1 is a perspective view of the device of this invention mounted in one position on a vehicle dashboard;

FIGURE 2 is a perspective view of the device of this invention mounted in an alternate position on a vehicle dashboard;

FIGURE 3 is a front elevational view of the vehicle registration holder;

FIGURE 4 is a rear elevational view of the vehicle registration holder with a portion thereof cut away to more fully illustrate its construction;

FIGURE 5 is a sectional view of the vehicle registration holder taken on line 5—5 of FIGURE 3;

FIGURE 6 is a partial perspective view of the upper portion of the vehicle registration holder; and FIGURE 7 is a partial sectional view of the vehicle registration holder taken on line 7—7 of FIGURE 6.

The numeral 10 generally designates a sheet of material which can be comprised of leather, imitation leather, plastic or any other such suitable substance. Sheet 10 includes a front portion 12, an upper back flap portion 14 and a lower back flap portion 15. The two flap portions are folded over in back of the front portion 12 to create a compartment 16. Elongated slots 17 appear at the dividing points between the front portion 12 and the two flap portions 14 and 15. Slots 17 are created by partially cutting through the thickness of sheet 10 at these locations and these slots serve to facilitate the bending of the flap portions back upon the front portion 12. A rectangular opening 18 appears in the front portion 12 and a transparent plastic panel 20 can be sewn to the inner surface thereof by stitching 22.

A stiffener panel 24 of cardboard or the like is inserted laterally into the compartment 16 to assume a position in between the panel 20 and the overlapping flap portions 14 and 15. The size of the stiffener panel 24 should be substantially the same as the interior area of the compartment 16.

An elongated vertical strap 26 has its upper end inserted between the overlapping flap portions 14 and 15. An aperture 28 appears in the lower end of the strap 26. Strap 26 is preferable comprised of a malleable metal or plastic for a purpose to be discussed hereafter. A rivet 30 extends through registering apertures in the overlapping flap portions 14 and 15, the upper end of the strap 26, and the stiffener panel 24.

When the above described components are assembled as indicated and as shown in the drawings, the vehicle registration certificate can be inserted into compartment 16 through one of the open lateral side edges of the compartment. The entire unit can be positioned on dashboard 32 of vehicle 34 as shown in FIGURE 2 by placing the lower end of strap 26 underneath the vehicle cowling 36. The aperture 28 in the lower end of the strap can be used to receive a metal screw or the like if such is desired. With reference to FIGURE 1, the strap 26 can be bent at 38 with the lower end of the strap being affixed in any convenient fashion to the cowling 36 of the vehicle. This bend 38 in the strap 26 will cause the registration holder to dwell in an upright position. Obviously, the degree to which the malleable strap 26 is bent can be varied as desired. In addition, the strap 26 can be rotated with respect to the rivet 30, as shown by the dotted lines in FIGURE 4, to provide additional variations in the manner in which the unit can be mounted on a vehicle.

The rivet 30, in addition to providing a pivotal support for the strap 26, serves to keep the flap portions 14 and 15, the stiffener panel 24, and the strap 26 secured together. The dual function served by the rivet 30 greatly adds to the economical fabrication of the unit.

Therefore, from the above, it is seen that this invention will accomplish at least all of its stated objectives.

Some changes may be made in the construction and arrangement of my vehicle registration holder without departing from the real spirit and purpose of my invention, and it is my intention to cover by my claims, any modified forms of structure or use of mechanical equivalents which may be reasonably included within their scope.

I claim:
In a vehicle registration holder,
a sheet portion comprised of flap portions separated by a center front portion,
said center portion having a rectangular opening therein,
a transparent plastic panel positioned over said opening,
said flap portions being folded upon said front portion in overlapping condition to form a compartment having open sides,
a stiffening panel imposed within said compartment between said front portion and said flap portions, an elongated supporting bracket extending into said compartment,
and a rivet extending through said flap portions, said bracket, and said stiffening panel,
said bracket being pivotally secured to said rivet.

References Cited by the Examiner

UNITED STATES PATENTS

| | | | |
|---|---|---|---|
| 1,683,645 | 9/28 | Abbey | 40—10 X |
| 1,799,756 | 4/31 | Ludwigson | 40—25 |
| 1,895,704 | 1/33 | Crosby | 40—101 |
| 1,974,661 | 9/34 | Singer | 40—10 |
| 2,158,402 | 5/39 | Chamberlain | 40—16 |

FOREIGN PATENTS 400,098   10/33   Great Britain.

EUGENE R. CAPOZIO, *Primary Examiner.*

JEROME SCHNALL, *Examiner.*